US005519929A

United States Patent [19]

Bleckman

[11] Patent Number: 5,519,929

[45] Date of Patent: May 28, 1996

[54] TOOL FOR REMOVING FAUCET COMPRESSION GASKET

[76] Inventor: Wilbert C. Bleckman, 12857 Pinefield Rd., Poway, Calif. 92064

[21] Appl. No.: 254,508

[22] Filed: Jun. 6, 1994

[51] Int. Cl.$^{6}$ .......... B23P 19/04

[52] U.S. Cl. .......... 29/264

[58] Field of Search .......... 29/256, 263, 264

[56] References Cited

U.S. PATENT DOCUMENTS

| | | | |
|---|---|---|---|
| 1,381,101 | 6/1921 | Albertson | 29/263 |
| 1,468,334 | 9/1921 | Thomason . | |
| 1,541,530 | 6/1925 | Schuman . | |
| 1,895,448 | 1/1933 | Cornwell . | |
| 2,036,782 | 4/1936 | Ullmo | 29/263 |
| 2,487,331 | 11/1949 | Greene | 29/264 |
| 3,104,459 | 9/1963 | Wendt | 29/264 X |
| 3,611,539 | 10/1971 | Meaden, Jr. | 29/263 X |
| 4,259,774 | 4/1981 | Dolinski et al. | 29/263 |
| 5,054,179 | 10/1991 | Rini | 29/213.1 |
| 5,119,556 | 6/1992 | Hseu | 29/264 |
| 5,170,548 | 12/1992 | Ramirez | 29/264 |

FOREIGN PATENT DOCUMENTS

| | | | |
|---|---|---|---|
| 602760 | 3/1926 | France | 29/263 |

*Primary Examiner*—Joseph M. Gorski
*Attorney, Agent, or Firm*—Calif Kip Tervo

[57] ABSTRACT

A tool for removing a compression gasket from a pipe generally comprises a sleeve and a rod; the sleeve having a cylindrical rear end for fitting over the end of the pipe and rear threads adapted for threadably engaging the front threads of a compression nut and a front end including internal threads; the rod passing longitudinally through the sleeve and having a rear end including a bearing adapted for bearing against the end face of the pipe, a central portion including threads threadably engaged with the internal threads of the front end of the sleeve and a front end including a nut or handle for turning the rod. Screwing the rod such that it moves rearward moves the sleeve and the compression nut forward such that the rear shoulder of the compression nut bears against the rear side of the gasket and pushes the gasket forward off the end of the pipe.

4 Claims, 1 Drawing Sheet

TOOL FOR REMOVING FAUCET COMPRESSION GASKET

BACKGROUND OF THE INVENTION

1. Field of the Invention

This invention relate to a plumbing tool and more specifically to a tool for removing a compression gasket from a pipe.

2. Background Art

A plumbing device, such as a faucet, is commonly attached to the end of a water-conducting pipe by use of a compression gasket and nut. Typically, the faucet includes rear threads which mate with the compression nut to compress a resilient, yet deformable, compression gasket between them. The compression gasket performs two major tasks; it forms a seal between the rear of the faucet and the outside diameter of the pipe and it tightly grips the pipe to hold the faucet from rotation. However, if the faucet must be replaced, the old compression gasket must be removed and a new compression gasket must be used to assure a seal against the faucet.

Removal of an old compression gasket presents two major problems. First, it is just physically difficult to remove a compression gasket. It has been deformed and compressed onto the pipe to form a water tight seal. Corrosion may have further bonded the washer to the pipe. Second, it is difficult to remove the gasket without damaging the pipe such that the new gasket will not seal against it. Any scaring of the pipe or deformation of the pipe will tend to make it difficult or impossible to slip a new washer into position or prevent the new washer from properly sealing. For these reasons, it is not uncommon for some plumbers to simply cut off the pipe rearward of the compression washer. Of course, this method can only be used on a given pipe a limited number of times.

An additional problem is that, due to the location of the pipe end, a large gasket removal tool cannot be utilized. Many pipe ends, for example for mounting the typically shut-off valve or plumber's faucet, are located under a shelf to the rear of a wash basin or sink or in back of a toilet such that there is little space in front of or to the sides of the pipe end.

Therefore, there has been a need for a tool to safely and effectively remove a compression gasket from a pipe.

It is also desirable that such a tool be simple in use and not require tools not ordinarily carried by a plumber to operate.

It is further desirable that such as tool be compact in size so as to be usable in tight location where there is little room.

SUMMARY OF THE INVENTION

This invention is a tool for removing a compression gasket from a pipe and it generally comprises a sleeve and a rod; the sleeve having a cylindrical rear end for fitting over the end of the pipe and rear threads adapted for threadably engaging the front threads of a compression nut and a front end including internal threads; the rod passing longitudinally through the sleeve and having a rear end including a bearing adapted for bearing against the end face of the pipe, a central portion including threads threadably engaged with the internal threads of the front end of the sleeve and a front end including a nut or handle for turning the rod.

Turning the rod such that it moves rearward moves the sleeve and the compression nut forward such that the rear shoulder of the compression nut bears against the rear side of the gasket and pushes the gasket forward off the end of the pipe.

An alternate embodiment includes an adapter nut. The sleeve rear end rear threads are adapted for threadably engaging the front threads of the adaptor nut and the adapter nut has walls defining a central bore for fitting over the outside diameter of the pipe and rear threads for threadably engaging the front threads of the compression nut.

The method of removing a compression gasket from a pipe comprises the steps of obtaining a tool such as described above, sliding the rear end of the sleeve over the end of the pipe, engaging the rear threads of the tool with the front threads of the compression nut, and applying a torque to the turning means such that the rod moves axially rearward relative to the sleeve such that the bearing bears against the end face of the pipe, the sleeve and engaged compression nut move forward and the rear shoulder of the compression nut bears against the rear side of the gasket and pushes the gasket forward off the pipe.

Other features and many attendant advantages of the invention will become more apparent upon a reading of the following detailed description together with the drawings in which like reference numerals refer to like parts throughout.

DETAILED DESCRIPTION OF THE INVENTION

Figure 1:
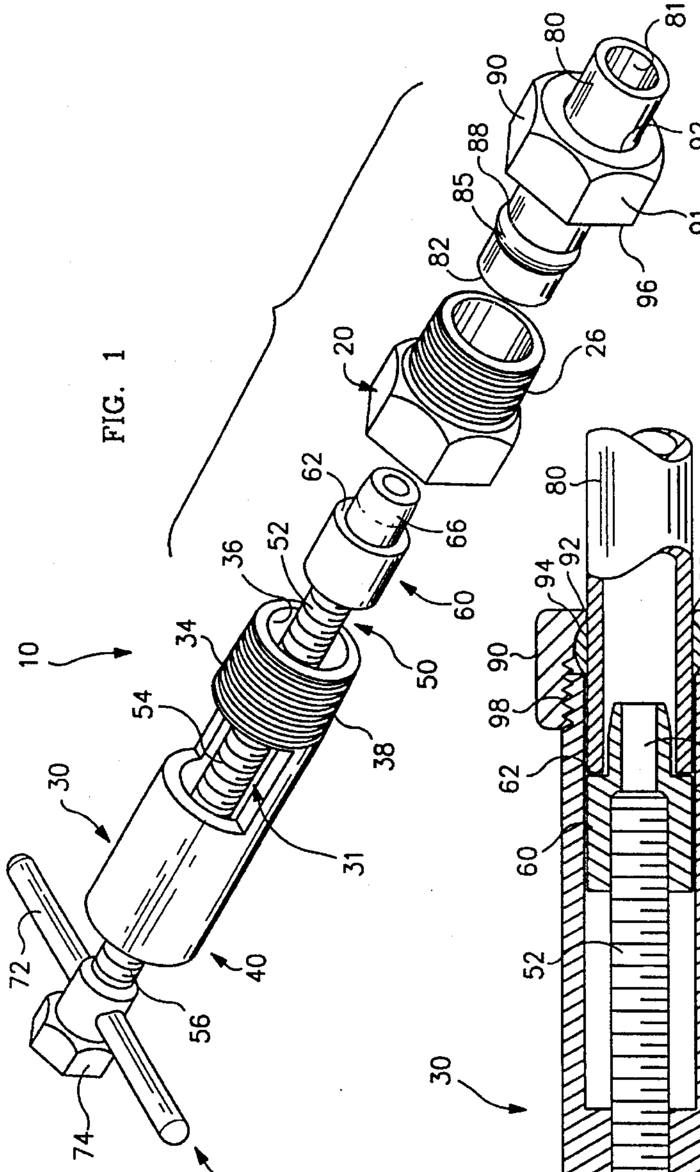
FIG. 1 is a perspective view, partially exploded, of a preferred embodiment of the faucet compression gasket removal tool of the invention including an adapter and its environment of use.

With reference now to the drawings, and more particularly to FIG. 1 thereof, there is shown a perspective view, partially exploded, of a preferred embodiment of the faucet compression gasket removal tool, denoted generally as 10, of the invention including an adapter nut, denoted generally as 20, and its environment of use including a pipe 80, compression gasket 85 and attachment or compression nut 90.

Pipe 80 is a typical elongated cylindrical pipe having an outside diameter, typically about 0,625 inches, and a wall, typically of 0.03 or 0.04 inches, defining a central bore or passage 81, having an inside diameter, along its longitudinal axis for transporting water or the like. Pipe 80 is made of suitable material, such as of copper or other metal, and has an end face 82 at substantially right angles to the longitudinal axis.

Compression gasket 85 is a cylindrical ring of resilient but deformable material, such as of brass or copper, having a rear side 88. Typical dimensions for a household compression gasket are: width of 0.313 inches and maximum thickness of 0.047 inches. Compression gasket 85 has been slid over pipe 80 such that it is located near the end face 82 of pipe 80 and has been deformed such that it tightly grips pipe 80.

Figure 2:
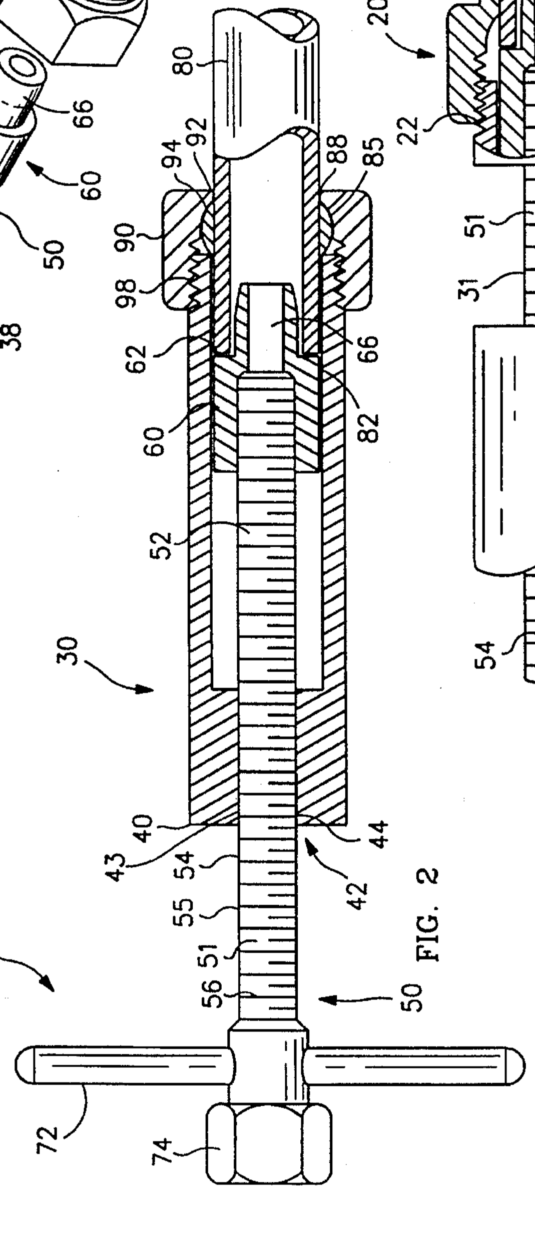
FIG. 2 is a side elevational view, partially shown in cross-section, of the tool as used without an adapter.
Figure 3:
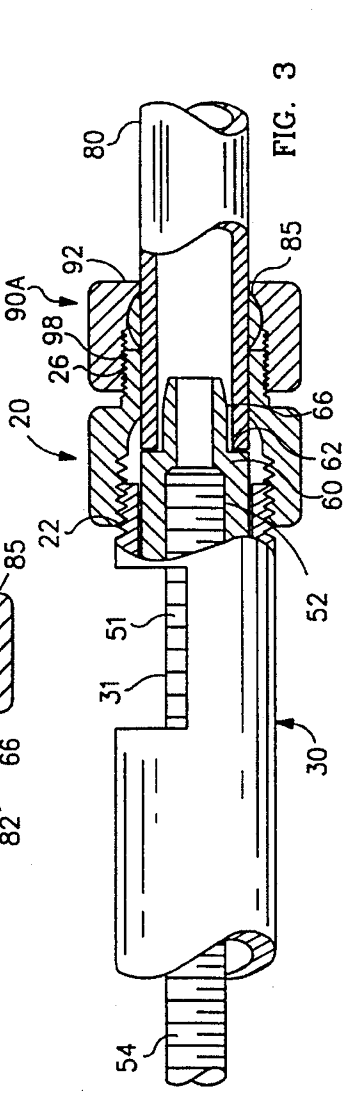
FIG. 3 is a side elevation view, partially cut away and partially shown in cross section, of the tool including the adapter in use.

Attachment or compression nut 90 is a typical plumbing hex nut. Compression nut 90 has a central bore 92 defining a longitudinal axis and surrounding pipe 80 and, as best seen in FIGS. 2 and 3, has a rear shoulder 94 abutting the rear side 88 of compression gasket 85. A front end 96, includes internal front threads 98 and the outside includes means, such as flats 91, for applying a torque. The size and gauge of compression nut threads 98 depends upon the type of faucet or other connection that was attached.

FIG. 2 is a side elevational view, partially shown in cross-section, of tool 10 as used without adapter nut 20.

FIG. 3 is a side elevation view, partially cut away and partially shown in cross section, of tool 10 including adapter nut 20 in use.

Now, with reference to all of the drawings, Tool 10 generally includes a sleeve, denoted generally as 30, having a rod, denoted generally as 50, passing longitudinally therethrough and may include one or more adapter nuts 20.

Sleeve 30 has a longitudinal axis and includes a cylindrical rear end 34 having walls defining an inside diameter 36 for fitting over the outside diameter of pipe 80 and having rear threads 38 adapted for threadably engaging the front threads 98 of compression nut 90 or rear threads 26 of adapter nut 20. Sleeve 30 includes means, such as side cut-out window 31, for observing the position of rod 50 within sleeve 30. Sleeve 30 includes a front end 40 including and end cap 42 having a central bore 43 having internal threads 44.

Rod 50 generally includes a shaft 51, a bearing device 60 and rod torquing means 70. Shaft 51 passes longitudinally through sleeve 30 and has a rear end 52, a central portion 54 and a front 56. In the preferred embodiment shown, shaft 51 is mainly a straight, elongated metal rod having threads 55 over its length.

Bearing device 60, attached to rod rear end 52 such as by threading, shown, includes a bearing surface, such as bearing 62, for bearing against pipe end face 82 and alignment plug 66 for aligning bearing 56. Alignment plug 66 has an outside diameter to just fit inside pipe 80 for centering bearing 62 on pipe end face 82. Bearing 62 should be centered on pipe end face 82 so as to not damage end face 82 during use of tool 10. Bearing device 60, shown, turns with shaft 51 such that bearing 62 frictionally rotates on pipe end face 82. Alternatively, bearing device 60 could be attached to shaft 51 such that the bearing device rotates relative to shaft 51 and does not have to spin against pipe end face 82. However, the simultaneously rotating bearing device 60, shown, has been shown to provide sufficient rotational bearing surface to allow rotation of shaft 51.

The outer diameter of the bearing portion of bearing device 60 is approximately the same outer diameter as pipe 80. Consequently, as compression gasket 85 is slid from pipe 80, compression gasket 85 has a tendency to stick to the outside diameter of bearing device 60. Such a stuck compression gasket 85 can be removed by moving rod 50 axially forward by counter-clockwise rotation, such that rear end 34 of sleeve 30 pushes compression gasket 85 off bearing device 60.

The threaded central portion 54 of shaft 51 is disposed through and is threadably engaged with internal threads 44 in central bore 43 of sleeve end cap 42 such that rotating shaft 51 axially moves rod 50 axially relative to sleeve 30. Preferably, the shaft thread is oriented such the turning that screws shaft 51 into sleeve 30 also tends to screw sleeve rear threads 38 onto compression nut 90. Typically, a clockwise movement of shaft 51 screws shaft 51 into sleeve 30.

Attached to shaft front end 56 is a turning or torquing means 70 for applying a torque to shaft 51 for turning shaft 51 relative to sleeve 30 such that shaft 51 moves axially relative to sleeve 30. Two torquing means are shown attached. Cross handle 72 is attached perpendicularly to shaft 51 and allows turning by hand in those cases where small torque is needed. Torque nut 74 is axially attached to shaft 51 for application of a wrench including a socket wrench and rachet driver, for providing greater torque. Torque nut 74 is typically a half-inch hex nut.

FIG. 2 shows the cooperation of the components in typical use. Sleeve rear end 34 is slid over the end of pipe 80 and rear sleeve threads 38 are engaged with front threads 98 of compression nut 90. Shaft 51 is rotated and moved axially such that bearing 62 bears against pipe end face 82. Further rearward relative axial movement of shaft 51 to sleeve 30 moves sleeve 30 and compression nut 90 forward relative to pipe 80 such that rear shoulder 94 of compression nut 90 bears against rear side 88 of gasket 85 and pushes gasket 85 forward and eventually off the end of pipe 80.

FIG. 3 shows the cooperation of the components in typically use including adapter nut 20. Adapter nut 20 is used to join rear sleeve threads 38 with a compression nut 90A having front threads 98 that will not mate with sleeve threads 38. This allows one sleeve 30 and rod 50 to be used with a multiplicity of sizes of compression nuts. Typically, sleeve threads 38 would be the common size for which tool 10 is to used. Adapter nut 20 has front threads 22 adapted for threadably engaging rear sleeve threads 38 and front threads 26 adapted for threadably engaging front threads 98 of compression nut 90A. An additional adapter nut 20 having appropriate rear configuration and rear thread may be provided to attach to any type of compression nut. Attaching adapter nut 20 to sleeve 30 essentially just lengthens the sleeve and tool 10 then works in the same manner as described above.

Tool 10 can be made very compact if desired. Sleeve 30 need only be slightly longer than the distance from pipe end face 82 to compression gasket 85 and rod 50 need only protrude in front of sleeve 30 by a similar length plus the width of compression gasket 85. Therefore, the length of the total too need only be a little over two times the distance between pipe end face 82 and compression washer 85. Consequently, tool 10 is usable in almost any position where a compression washer has been used.

Having described the invention, it can be seen that it provides a very convenient device for removing plumbing compression gaskets.

Although a particular embodiment of the invention has been illustrated and described, various changes may be made in the form, composition, construction, and arrangement of the parts without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. A tool for removing a compression gasket from a pipe, the gasket disposed near an end face of the pipe, the gasket having a rear side, the gasket having an associated compression nut, the compression nut having a rear shoulder abutting the rear side of the compression gasket and having a front end including front threads; said tool comprising:

- a sleeve having a longitudinal axis and a first inner diameter, and including:

a cylindrical rear end having:

an inside diameter for fitting over the outside diameter of the pipe; and rear threads on an outer circumference of said sleeve adapted for threadably engaging the front threads of the compression nut; and a front end including:

internal threads; and a rod passing longitudinally through said sleeve including:

a central portion having a diameter including:

threads threadably engaged with said internal threads of said front end of said sleeve;

a rear end including:

a bearing device having;

a first portion with an outside diameter greater than said diameter of central portion and slightly less than said inner diameter of said sleeve;

a second portion including:

a conical rear end tapering forwardly outward toward said first portion; and a central cylindrical part merging with said conical rear end and having a diameter less than said outside diameter of said first portion and slightly less than the inside diameter of the pipe for entry into the pipe for centering said bearing device on said pipe; and a shoulder interconnecting said central part with said first portion; said shoulder defining a bearing surface adapted for bearing against an end face of the pipe; and a front end including:

turning means for applying a torque to said rod for turning said rod for axially moving said rod relative to said sleeve such that, when said rear threads of said sleeve are engaged with the front threads of the compression nut and said bearing bears against the pipe end face, further rearward relative axial movement of said rod moves said sleeve and the compression nut forward such that the rear shoulder of the compression nut bears against the rear side of the gasket and pushes the gasket forward.

2. The tool of claim 1 wherein:

said sleeve includes observing means for observing the position of said rod in said sleeve.

3. A tool for removing a compression gasket from a pipe, the gasket disposed near an end face of the pipe, the gasket having a rear side, the gasket having an associated compression nut, the compression nut having a rear shoulder abutting the rear side of the compression gasket and having a front end including front threads; said tool comprising:

a sleeve having a longitudinal axis and a first inner diameter, and including:

a cylindrical rear end having:

an inside diameter for fitting over the outside diameter of the pipe; and rear threads on an outer circumference adapted for threadably engaging the front threads of an adaptor nut; and a front end including:

internal threads;

an adapter nut having:

walls defining a central bore for fitting over the outside diameter of the pipe;

a front end including;

front threads for threadably engaging said rear threads of said sleeve; and a rear end including:

rear threads for threadably engaging the front threads of the compression nut; and a rod passing longitudinally through said sleeve including:

a central portion having a diameter including:

threads threadably engaged with said internal threads of said front end of said sleeve;

a rear end including:

a bearing device having;

a first portion with an outside diameter greater than said diameter of central portion and slightly less than said diameter of said sleeve;

a second portion including:

a conical rear end tapering forwardly outward toward said first portion; and a central cylindrical part merging with said conical rear end and having a diameter less than said outside diameter of said first portion and slightly less than the inside diameter of the pipe for entry into the pipe for centering said bearing device on said pipe; and a shoulder interconnecting said central part with said first portion; said shoulder defining a bearing surface adapted for bearing against an end face of the pipe; and a front end including:

turning means for applying a torque to said rod for turning said rod for axially moving said rod relative to said sleeve such that, when said rear threads of said sleeve are engaged with the front threads of the compression nut and said bearing bears against the pipe end face, further rearward relative axial movement of said rod moves said sleeve and the compression nut forward such that the rear shoulder of the compression nut bears against the rear side of the gasket and pushes the gasket forward.

4. The tool of claim 3 wherein:

said sleeve includes observing means for observing the position of said rod in said sleeve.

* * * * *